US006147880A

United States Patent [19]

Fuhr et al.

[11] Patent Number: 6,147,880

[45] Date of Patent: Nov. 14, 2000

[54] LIGHT AND SWITCH MOUNTING ASSEMBLY

[75] Inventors: Kevin J. Fuhr, Goshen; Michael C. Guerrette, Bristol, both of Conn.

[73] Assignee: General Electric Company, Schenectady, N.Y.

[21] Appl. No.: 09/175,626

[22] Filed: Oct. 20, 1998

[51] Int. Cl.[7] .................................................. H02B 1/04

[52] U.S. Cl. ........................... 361/825; 200/295; 310/73; 362/394

[58] Field of Search .................................... 200/294, 295; 362/95, 190, 295, 368, 394, 417, 431, 432; 310/68 R, 68 A, 73; 248/309.1, 507, 508; 361/600, 622, 807–811, 825

[56] References Cited

U.S. PATENT DOCUMENTS 4,992,918 2/1991 Shioiri .
5,181,168 1/1993 Seitz .
5,272,603 12/1993 Camarota .
5,386,358 1/1995 Hillinger .
5,438,483 8/1995 Fasano .
5,448,495 9/1995 Liu .

*Primary Examiner*—Gerald Tolin
*Attorney, Agent, or Firm*—Cantor Colburn LLP; Carl B. Horton

[57] ABSTRACT

A mounting assembly for mounting an electronic component to an electric motor starter comprises a mounting bracket and a locating bracket. The locating bracket releasably attaches to the mounting bracket and to the associated motor starter. The mounting bracket comprises light and switch mounting portions for releasably engaging the light and switch modules, respectively. A pair of snap-fit fasteners extend outwardly from the switch mounting portion for releasably engaging the switch module. The light mounting portion includes an aperture and pair of slots disposed therethrough for releasably receiving the socket and legs of the light module. A snap-fit fastener extends from the back side of the mounting bracket for releasably engaging the locating bracket.

16 Claims, 2 Drawing Sheets

LIGHT AND SWITCH MOUNTING ASSEMBLY

BACKGROUND OF THE INVENTION

The present invention relates to brackets used to mount electronic components to electric motor starters or contactors. More specifically, the present invention relates to brackets that enable the snap-fit mounting of light and switch modules to electric motor starters or contactors, allowing for improved serviceability and design flexibility.

Electric motors are often fitted with starters or contactors on their voltage supply lines to facilitate the stopping, starting, reversing, and/or speed control of the motor. These starters, in general, include magnetically operated electrical contacts which close by the application of current to a magnetic coil and are held closed by the continued application of current to the same coil. The voltage supplied to the magnetic coil is usually lower than the line voltage supplied to the motor via the contacts.

A lower-voltage control circuit provides power to the magnetic coil within the starter. This control circuit can include a variety of electronic components. Such components may include selector switches and push buttons to control the flow of electric current to the magnetic coil, and lights to indicate the various states of motor operation. These components are normally mounted on brackets which are mounted directly to the starter. A number of components may be mounted together, forming an electronic component group.

Higher voltage supply lines provide power to the associated motor via the contacts within the starter. During installation of the starter, the technician must electrically connect these higher-voltage supply lines to connectors within the starter. During maintenance of the starter, the technician must inspect these connectors. Unfortunately, the electronic components of the lower voltage control circuit and their mounting brackets interfere with the installation and inspection of these connectors, making it necessary to remove the components and their brackets.

Generally, the bracket for mounting an electronic component to the motor starter is constructed of a single, metal assembly which is bolted directly to the starter. Each component has its own metal bracket and the individual brackets are bolted together, as well as to the starter, to form a component group.

To remove the components and their brackets, the technician must unbolt the individual components from the brackets, then disassemble portions of the starter to remove the brackets. To install the components and their brackets, the technician must attach the brackets, reassemble the starter, then bolt the individual electronic components to the brackets while insuring that the components are aligned correctly. The number of steps to remove and install the electronic components and their mounting brackets increase the time and cost to install and perform maintenance on starters.

BRIEF SUMMARY OF THE INVENTION

In an exemplary embodiment of the invention, an electronic component mounting assembly comprises a locating bracket extending from an electric motor starter. A mounting bracket is releasably engaged to the locating bracket by a first snap-fit fastener extending from the mounting bracket. The mounting bracket includes a mounting portion for accepting the electronic component. A second snap-fit fastener extends from the mounting portion for releasably engaging the electronic component.

BRIEF DESCRIPTION OF THE DRAWINGS

The present invention will now be described, by way of example only, with reference to the accompanying drawing in which.

DETAILED DESCRIPTION OF THE INVENTION

Figure 1:
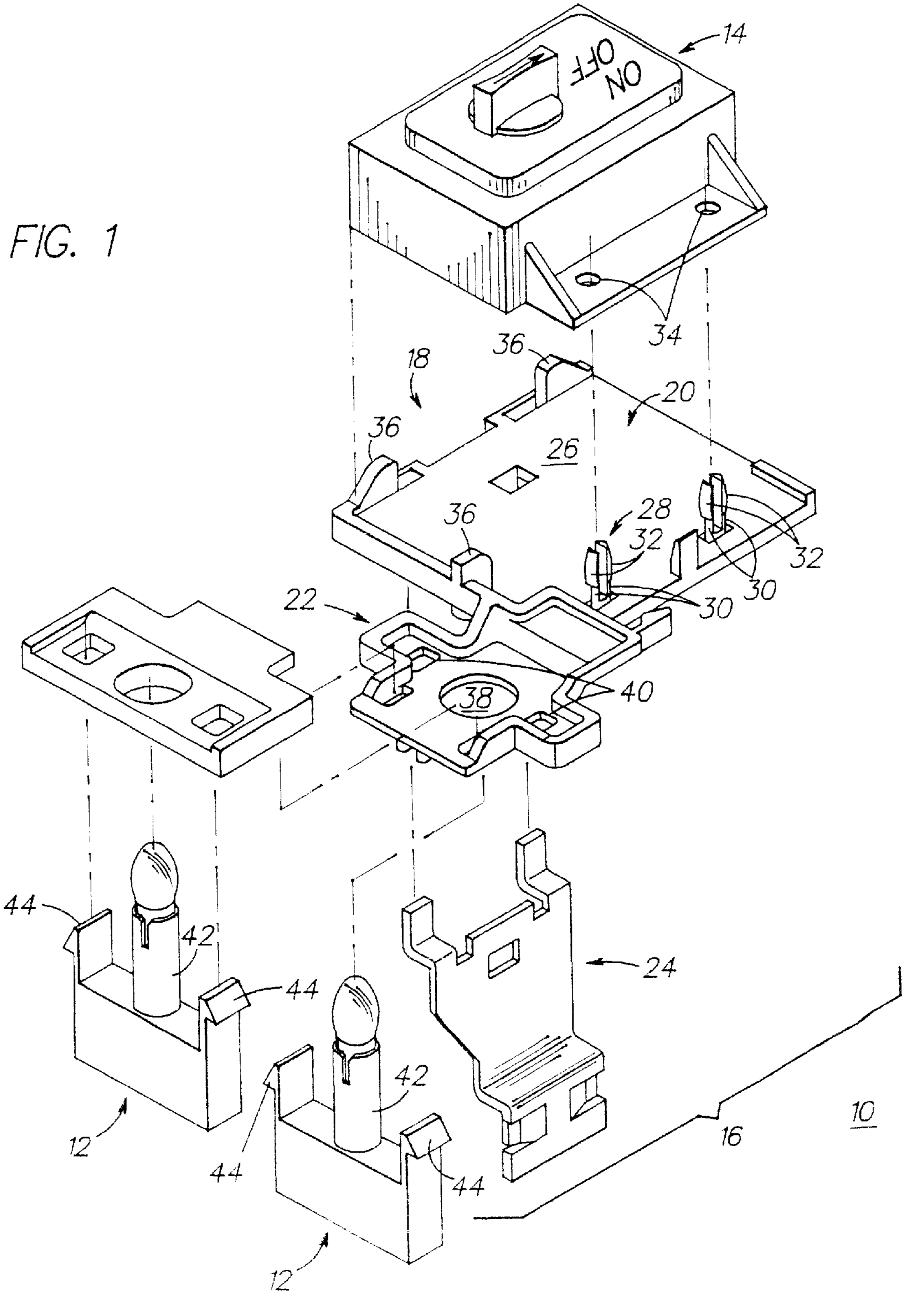
FIG. 1 is an exploded perspective view of the front side of an electronic component group including a light and switch mounting assembly embodying the present invention.

Referring to FIG. 1, the electronic component group of the present invention, generally designated 10, includes a light module 12 and a switch module 14 both disposed on a mounting assembly 16 which releasably attaches to an associated motor starter or contactor (not shown).

The motor starter (not shown) includes magnetically operated electrical contacts (not shown) which close by the application of current to a magnetic coil (not shown) and are held closed by the continued application of current to the same coil. Power to the magnetic coil is provided by a control circuit (not shown) within the starter. The light module 12, such as that commercially available from the General Electric Company (General Electric's "P9PDNVO" light module), is electrically connected to the control circuit within the associated motor starter for indicating the various states of motor operation. For example, light module 12 may indicate whether the motor is running or stopped. The switch module 14, such as that commercially available from the General Electric Company (General Electric's "CR305X130P" switch module), is electrically connected to the control circuit for controlling current within the control circuit. The operation of the motor starter, the use of switch and light modules 12, 14, and their function in the control circuit of a starter or contactor are well known in the art.

The mounting assembly 16 includes a mounting bracket 18 and a locating bracket 24. The locating bracket 24 releasably attaches to the mounting bracket 18 and to the associated motor starter. The mounting bracket comprises light and switch mounting portions 22, 20 for releasably engaging the light and switch modules 12, 14. The mounting bracket 18 is preferably integrally molded of a single layer of plastic material and thus is relatively easy to manufacture. The locating bracket 24 is preferably stamped from a rigid material such as steel.

The switch mounting portion 20 includes a substantially flat surface 26 formed on the front side of the mounting bracket 18. A pair of snap-fit fasteners 28 extend outwardly from the switch mounting portion 20 for releasably engaging the switch module 14. The snap-fit fasteners 28 each comprise a pair of opposing legs 30 having a rounded detent 32 that extends outwardly from the free end of each of the opposing legs 30. The opposing legs 30 are resiliently flexible, allowing the detents 32 to pass through bores 34 disposed in the switch module 14 and snap-fit the switch module 14 to the switch mounting portion 20.

The switch mounting portion 20 of the mounting bracket 18 further includes a plurality of tabs 36 extending outwardly therefrom for supporting and aligning the switch module 14 on the center of the switch mounting portion 20.

The tabs 36 are disposed about the periphery of the switch mounting portion 20 to contact and align the switch module 14 when it is snap-fit to the switch mounting portion 20.

The switch module 14 is removed from the mounting bracket 18 by simply pulling the switch module 14 away from the surface 26 of the switch mounting portion 20. The switch module 14 is attached to the mounting bracket 18 by aligning the fasteners 28 with the bores 34 and pressing the switch module 14 towards the flat surface 26 until the detents 32 pass through bores 34 and snap-fit the switch module 14 into place.

The light mounting portion 22 of the mounting bracket 18 is a substantially flat surface extending from, and substantially parallel to, the flat surface 26 of the switch mounting portion 20. The light mounting portion 22 includes an aperture 38 and pair of slots 40 disposed therethrough for receiving socket 42 and legs 44, respectively, extending from the light module 12. The legs 44 of the light module 12 are resiliently flexible with detent ends to pass through the slots 40 in the light mounting portion 22 and snap-fit the light module 12 to the light mounting portion 22 of the mounting bracket 18.

The light module 12 is removed from the light mounting portion 22 of the mounting bracket 18 by deflecting the legs 44 towards each other so that their detent ends can pass through slots 40. At the same time, the light module 12 is pulled away from the light mounting portion 22. The light module 12 is reattached by aligning the socket 42 and legs 44 with the aperture 38 and slots 40, then pressing the light module 12 towards the light mounting portion 22 until the detents at the end of legs 44 pass through the slots 40 and snap-fit the light module 12 into place.

Figure 2:
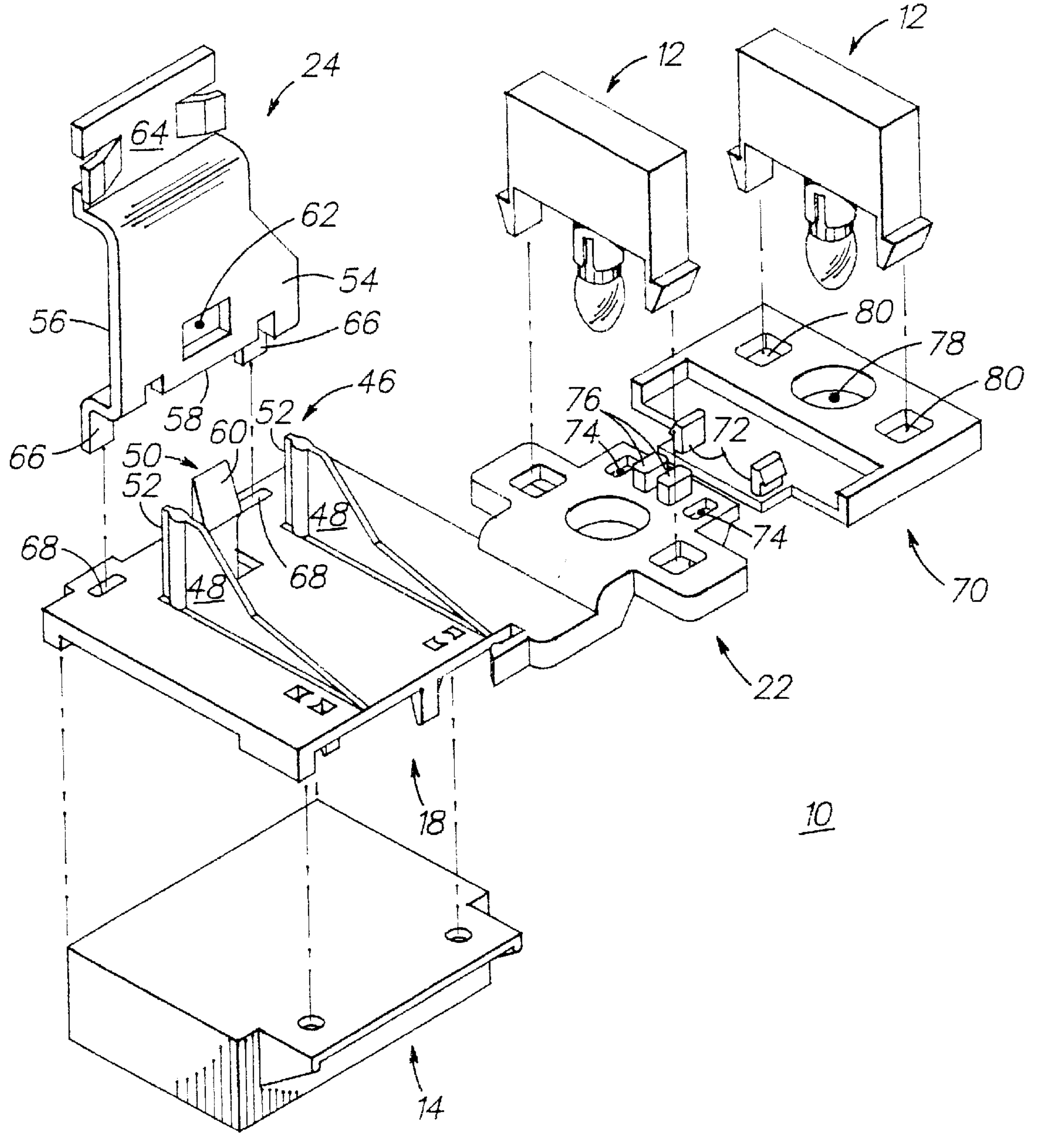
FIG. 2 is an exploded perspective view of the back side of the electronic component group of FIG. 1.

Referring to FIG. 2, the back side of the mounting bracket 18 includes a snap-fit fastener 46 extending therefrom for releasably engaging the locating bracket 24. The fastener 46 comprises a pair of support members 48 and a resiliently flexible leg 50. Each support member 48 is substantially triangular in shape with a contact edge 52 formed on one side for engaging a top side 54 of the locating bracket 24. The resiliently flexible leg 50 extends outwardly from the back side of the mounting bracket 18 for contacting a bottom side 56 of the locating bracket 24. A first end 58 of the locating bracket 24 is slidably engaged between the contact edges 52 of the support members 48 and the leg 50. When the locating bracket 24 is fully engaged, a detent 60 on the end of the leg 50 mates with a slot 62 in the locating bracket 24, thereby snap-fitting the mounting bracket 18 to the locating bracket 24.

The locating bracket 24 further includes a plurality of legs 66 extending from the first end 58. The legs 66 mate with a plurality of slots 68 disposed in the mounting bracket 18 for stabilizing the mounting bracket 18. Additionally, the locating bracket 22 includes a tongue 64 extending in a direction opposite the first end 58. The tongue 64 slidably engages a groove (not shown) in the associated starter (not shown) for firmly securing the locating bracket 24 to the starter.

The mounting bracket 18 is removed from the locating bracket 24 by slidably disengaging the first end 58 of the locating bracket 24 from the snap-fit fastener 46. The mounting bracket 18 is attached to the locating bracket 24 by slidably engaging the first end 58 of the locating bracket 24 between the leg 50 and the contact edges 52 until the detent 60 engages the slot 62 in the locating bracket 24.

The mounting bracket 18 may further comprise a detachable light bracket 70 releasably attached to the light mounting portion 22. A pair of resiliently flexible legs 72, each with a detent on a free end, extends from the detachable light bracket 70. These legs 72 are resiliently flexible to enable their detents to pass though a pair of slots 74 disposed in the light mounting portion 22 of the mounting bracket 18 to snap-fit the detachable light bracket 70 to the light mounting portion 22. A plurality of tabs 76 extends from the light mounting portion 22 of the mounting bracket 18 to prevent the detachable light bracket 70 from being installed in an incorrect position. The detachable light bracket 70 includes an aperture 78 and a plurality of slots 80, allowing a light module 12 to be snap-fit to the detachable light bracket 70 in the same manner as that described for the light mounting portion 22 of the mounting bracket 18. The detachable light bracket 70 allows an additional light module 12 to be added to the component group 10 for indicating failure within the controller in a well known manner.

The snap-fit fasteners of the above described invention reduce the time to install or remove the light and switch modules 12, 14, and mounting bracket 18, from the motor starter to less than was previously possible. Bolting and unbolting are no longer required. In addition, the tabs 36, 76 of the above described invention insure the proper position of the electronic components 12, 14 and the detachable light bracket 70 on reassembly.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A mounting assembly for mounting an electronic component to an electric motor starter; the mounting assembly comprising:

- a locating bracket extending from the electric motor starter; and
- a mounting bracket including;
  - a first snap-fit fastener formed on a first side of the mounting bracket, the first snap-fit fastener releasably engaging the locating bracket,
  - a first mounting portion formed on a second side of the mounting bracket, and
  - a second snap-fit fastener extending from the first mounting portion, the second snap-fit fastener releasably engaging the electronic component.

2. A mounting assembly, as defined in claim 1, further including a tab extending from the first mounting portion and contacting the electronic component.

3. A mounting assembly, as defined in claim 1, wherein the electronic component comprises a switch module.

4. A mounting assembly, as defined in claim 1, wherein the second snap-fit fastener includes a first plurality of resiliently flexible legs extending from the first mounting portion, the first plurality of resiliently flexible legs each having a first detent at an end portion, the detents releasably engaging the electronic component.

5. A mounting assembly, as defined in claim 1, wherein the mounting bracket further includes a second mounting portion, the second mounting portion including a first aperture and a first plurality of slots configured to receive a first light module.

6. A mounting assembly, as defined in claim 5, further including:

- a detachable light bracket including a third snap-fit fastener extending therefrom, the third snap-fit fastener releasably engaging the second mounting portion of the mounting bracket, the detachable light bracket further including a second aperture and a second plurality of slots disposed therein, the second aperture and the second plurality of slots configured to receive a second light module.

7. A mounting assembly, as defined in claim 6, wherein the third snap-fit fastener includes a second plurality of resiliently flexible legs extending from the detachable light bracket, the second plurality of resiliently flexible legs each having a second detent at an end portion; and the second mounting portion of the mounting bracket includes a third plurality of slots configured to receive the second plurality of resiliently flexible legs.

8. A mounting assembly, as defined in claim 6, further including a tab extending from the mounting bracket, the tab being arranged to prevent the incorrect installation of the detachable light bracket.

9. A mounting assembly, as defined in claim 1, wherein the first snap-fit fastener includes:

a support member extending from the mounting bracket, the support member contacting a first side of the locating bracket; and a resiliently mounted leg extending from the mounting bracket, the resiliently mounted leg contacting a second side of the locating bracket, the resiliently mounted leg having a detent extending therefrom, the detent engaging a slot disposed in the locating bracket.

10. An electronic component group for mounting to an electric motor starter; the component group comprising:

a switch module electrically connected to the electric motor starter;

a first light module electrically connected to the electric motor starter;

a locating bracket extending from the motor starter; and a mounting bracket including:

a first snap-fit fastener releasably engaging the locating bracket, a switch mounting portion secured to the first snap-fit fastener, the switch mounting portion releasably engaging the switch module, and a light mounting portion extending from the switch mounting portion, the light mounting portion releasably engaging the first light module.

11. An electronic component group, as defined in claim 10, wherein the mounting bracket further includes:

a second snap-fit fastener extending from the switch mounting portion of the mounting bracket, the second snap-fit fastener releasably engaging the switch module.

12. An electronic component group, as defined in claim 11, wherein the second snap-fit fastener includes a plurality of resiliently flexible legs extending from the switch mounting portion, the plurality of resiliently flexible legs each having a detent at an end portion, the detents releasably engaging the switch module.

13. An electronic component group, as defined in claim 10, wherein the first light module includes a socket and a plurality of resiliently flexible legs, the plurality of resiliently flexible legs each having a detent at an end portion; and the light mounting portion includes an aperture and a plurality of slots, the aperture and the plurality of slots receiving the socket and resiliently flexible legs of the first light module.

14. An electronic component group, as defined in claim 10, wherein the first snap-fit fastener includes a plurality of support members extending from the mounting bracket, the support members each having a contact edge contacting a first side of the locating bracket, and a leg extending from the mounting bracket and contacting a second side of the locating bracket, the leg having a detent on a free end the detent engaging a slot disposed in the locating bracket.

15. An electronic component group, as defined in claim 10, further including:

a second light module electrically connected to the electric motor starter, the second light module having a socket and a first plurality of resiliently flexible legs, the first plurality of resiliently flexible legs each having a first detent at an end portion; and a detachable light bracket including an aperture and a first plurality of slots arranged to receive the socket and the first plurality of resiliently flexible legs, and a second snap-fit fastener releasably engaging the light mounting portion of the mounting bracket.

16. An electronic component group, as defined in claim 15, wherein the second snap-fit fastener includes a second plurality of resiliently flexible legs extending from the detachable light bracket, the second plurality of resiliently flexible legs each having a second detent at an end portion; and the light mounting portion of the mounting bracket includes a second plurality of slots arranged to receive the second plurality of resiliently flexible legs.

* * * * *